US 6,729,365 B1

(12) United States Patent
Cote et al.

(10) Patent No.: US 6,729,365 B1
(45) Date of Patent: May 4, 2004

(54) DISTRIBUTION DEVICE FOR USE WITH A SILO

(76) Inventors: Laval Cote, 1191 rang 6, St-Prime (CA), G8J 1X8; Yoland Guay, 1130 rue St-Paul, St-Felicien (CA), G8K 2R3

( * ) Notice: Subject to any disclaimer, the term of this patent is extended or adjusted under 35 U.S.C. 154(b) by 0 days.

(21) Appl. No.: 10/400,689

(22) Filed: Mar. 28, 2003

(51) Int. Cl.[7] .................................................. B65B 1/20
(52) U.S. Cl. ........................ 141/69; 141/286; 141/125
(58) Field of Search .......................... 141/69, 286, 125; 222/63, 234, 410; 239/650, 663

(56) References Cited

U.S. PATENT DOCUMENTS

| 670,581 | A | | 3/1901 | Erisman |
|---|---|---|---|---|
| 1,864,851 | A | * | 6/1932 | Noble .......................... 414/300 |
| 2,735,591 | A | | 2/1956 | Branchflower |
| 3,430,788 | A | | 3/1969 | Edming |
| 3,490,619 | A | * | 1/1970 | DeWittie ..................... 239/687 |
| 3,572,523 | A | | 3/1971 | Cymara |
| 3,582,145 | A | | 6/1971 | Janssen et al. |
| 3,698,576 | A | | 10/1972 | Gillette |
| 3,817,408 | A | | 6/1974 | Hanson |
| 3,826,385 | A | | 7/1974 | Bluntzer |
| 3,881,409 | A | * | 5/1975 | Frigieri ......................... 100/68 |
| 3,885,684 | A | | 5/1975 | Mitchell |
| 3,924,761 | A | | 12/1975 | Lambert |
| 3,955,691 | A | | 5/1976 | Zaruba et al. |
| 4,159,151 | A | | 6/1979 | Wood |
| 4,228,934 | A | * | 10/1980 | Carr ............................ 222/412 |
| 4,350,468 | A | * | 9/1982 | Julke ........................... 285/331 |
| 4,395,182 | A | | 7/1983 | Suwyn |
| 4,555,210 | A | | 11/1985 | Wigram |
| 4,773,797 | A | | 9/1988 | Merz |
| 4,972,884 | A | | 11/1990 | Souers et al. |
| 5,238,035 | A | | 8/1993 | Poussin et al. |
| 5,746,258 | A | | 5/1998 | Huck |
| 6,062,426 | A | | 5/2000 | Bartholemey et al. |

FOREIGN PATENT DOCUMENTS

| DE | 1756419 B | * | 10/1975 | |
|---|---|---|---|---|
| DE | 3617385 A1 | * | 11/1987 | .................. 222/410 |
| JP | 2002240960 A | * | 8/2002 | |

* cited by examiner

*Primary Examiner*—Gregory Huson
*Assistant Examiner*—Khoa Huynh

(57) ABSTRACT

A particulate material distribution device for evenly distributing particulate material in a silo, which includes a frame connected to a silo upper end. The frame supports a feeder conduit having a feeder end portion, which is at least partially positioned in an open end of the silo. The feeder conduit has a feeder conduit axis, which is generally parallel to a silo sidewall. The device includes a rotatable sweeper arm connected to the frame and positioned generally orthogonal relative to the feeder conduit axis. The rotatable sweeper arm is at least partially positioned in the open end of the silo and spaced apart from the feeder conduit end and having a sweeper arm axis of rotation which is generally parallel to the feeder conduit axis.

16 Claims, 8 Drawing Sheets

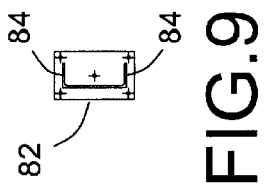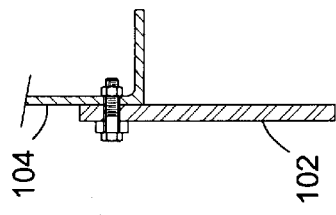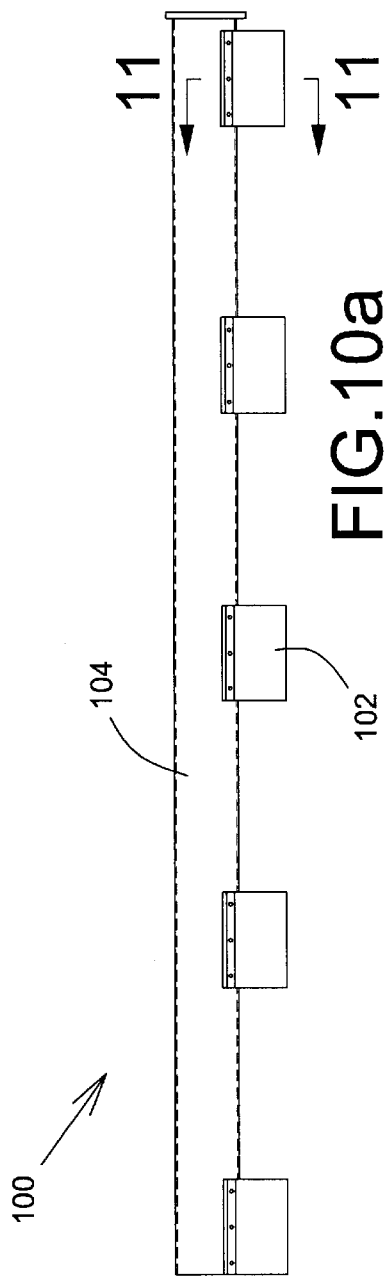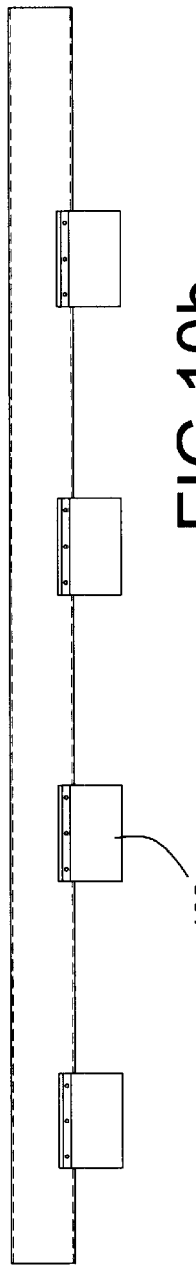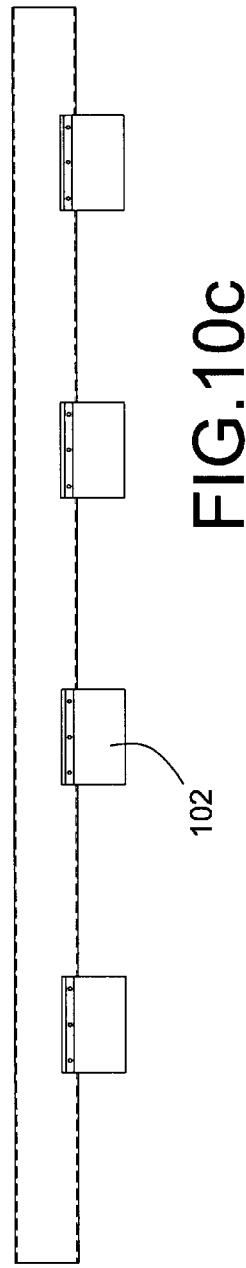

DISTRIBUTION DEVICE FOR USE WITH A SILO

FIELD OF THE INVENTION

The present invention concerns silos, more particularly to distribution devices for use with particulate material in silos.

BACKGROUND OF THE INVENTION

Silos are commonplace and are used to receive and store particulate material such as silage, grain or woodchips. Generally, a silo includes a hopper, which is connected to a feeder pipe for feeding the material from a source into the silo. The material fills the silo to a predetermined level and then typically, an operator stops the operation. This operation while straightforward suffers from a number of significant drawbacks. Undesirably, particulate material tends to forms peaks as the material fills the silo. The silo's storage space is thus used inefficiently because the area around the material peak, when the peak is at a maximum height, is left unfilled. If the material peak is left to increase in size, it will eventually block the feeder pipe. This is particularly problematic in applications that require feeding of material into the silo and then generally immediate use after filling, for example, in temporarily storing woodchips in the silo and then feeding the woodchips into a drying oven. An operation of this type normally requires continuous monitoring by an operator to turn off the feeder when the material peak reaches its maximum level.

Several distribution device designs have been made to solve the aforesaid problems, a few examples of which include:

U.S. Pat. No. 3,430,788, issued Mar. 4, 1967 to Edming for "Silage Distributor";

U.S. Pat. No. 4,159,151, issued Jun. 26, 1979, to Wood for "Silo Filling Apparatus";

U.S. Pat. No. 4,555,210, issued Nov. 26, 1985 to Wigram for "Spreader Device in a Storage Container for Uniform Filling of the Container with Granular Goods";

U.S. Pat. No. 4,972,884, issued Nov. 27, 1990 to Souers et al. for "Method and Apparatus for Uniformly Loading Particulate Material into, Cylindrical Beds"; and U.S. Pat. No. 5,238,035, issued Aug. 24, 1993 to Poussin et al. for "Equipment for Filling a Container with a Divided Solid Product".

The designs above, however, suffer from a number of important disadvantages. Most are of a complex design, which may not allow for retrofitting onto an existing silo. Several of the designs include rotator elements that rotate about an axis, which is axially aligned with the feeder tube. The rotator elements are often substantially smaller than the diameter of the silo and as such may not uniformly distribute the particulate material in the silo. Disadvantageously, the rotator elements do not appear to be activatable when the material begins to form the aforesaid peaks and as such would require constant monitoring by the user to prevent the feeder tube's blockage.

Thus there is a need for an improved distribution device.

SUMMARY OF THE INVENTION

The present invention is directed towards a solution to the aforesaid problems by providing a novel parallel arrangement of an axis of rotation of a number of sweeper arms and a feeder conduit axis. Advantageously, this parallel arrangement allows particulate material that exits the feeder conduit to be captured by the sweeper arm and deposited in a uniform manner over the surface of the particulate material. This uniform distribution significantly increases the efficient use of silo storage space because the sweeper arms substantially reduce or essentially eliminate the formation of peaked material in the silo. Moreover, reduction of peak formation also reduces obstruction of the feeder conduit by the peaked material. Furthermore, a sonic sensor detects the level of the particulate material in the silo and automatically controls the sweeper arm's rotation, thereby allowing the silo to operate essentially unattended. In addition, a frame is used to mount the sweeper arms adjacent the feeder conduit and thus is easily retrofitted onto the top of an existing silo. Also, by using the device to distribute the particulate material, its compaction in the silo is significantly reduced.

In a first aspect of the present invention, there is provided a particulate material distribution device for evenly distributing particulate material in a silo, said silo including a frame connected to a silo upper end for supporting a feeder conduit having a feeder end portion which is at least partially positioned in an open end of said silo, said feeder conduit having a feeder conduit axis which is generally parallel to a silo sidewall, said device comprises:

a rotatable sweeper arm connected to said frame and positioned generally orthogonal relative to said feeder conduit axis, said rotatable sweeper arm being at least partially positioned in said open end of said silo and spaced apart from said feeder conduit end and having a sweeper arm axis of rotation which is generally parallel to said feeder conduit axis.

Typically, the rotatable sweeper arm receives said particulate material from said feeder conduit end and sweeps said particulate material along a path of travel from said feeder conduit end towards said silo sidewall, said particulate material being evenly distributed over a surface of said particulate material adjacent said sweeper arm so that said feeder conduit end is unobstructed by said particulate material. The device typically comprises three rotatable sweeper arms. Each sweeper arm extends radially outwardly from a sweeper axle, said axle being connected to said frame.

Typically, each sweeper arm includes: an arm connector portion connected to said sweeper axle; a distal end portion; and an intermediate arm portion interconnecting said connector portion and said distal end portion. The intermediate arm portion includes: a leading wall and two trailing walls, said leading wall being generally parallel to said sweeper, axis of rotation, said trailing walls being generally horizontal.

Typically, each sweeper arm is arcuate in the direction of said rotation.

In another aspect of the first embodiment, a plurality of spaced apart arm panels are connected to said intermediate arm portion, each arm panel depending from said leading wall.

Typically, the feeder conduit axis is located generally centrally said silo, said sweeper arm axis of rotation being off-center such that said sweeper arm rotates eccentrically.

Typically, the device further comprises: a level sensor connected to said frame and in communication with said rotatable sweeper arm to provide a first signal to said sweeper arm to rotate when a first portion of said particulate material reaches a first predetermined level in said silo. The sensor provides a second signal to said sweeper arm to stop rotation when a second portion of said particulate material reaches a second predetermined level in said silo. The first portion of said particulate material is peaked. The second portion of said material is generally planar.

Other advantages of the present invention will become apparent from the detailed description provided herein, with appropriate reference to the accompanying drawings.

BRIEF DESCRIPTION OF THE FIGURES

Further aspects and advantages of the present invention will become better understood with reference to the description in association with the following Figures, wherein:

FIG. 9 is an end on view of a sweeper arm;

FIGS. 10a to 10c are rear views of alternative sweeper arms showing panels; and

FIG. 11 is an enlarged cross section view taken along line 11—11 of FIG. 10a, showing a panel connected to a sweeper arm.

DETAILED DESCRIPTION OF THE PREFERRED EMBODIMENT

Figure 1:
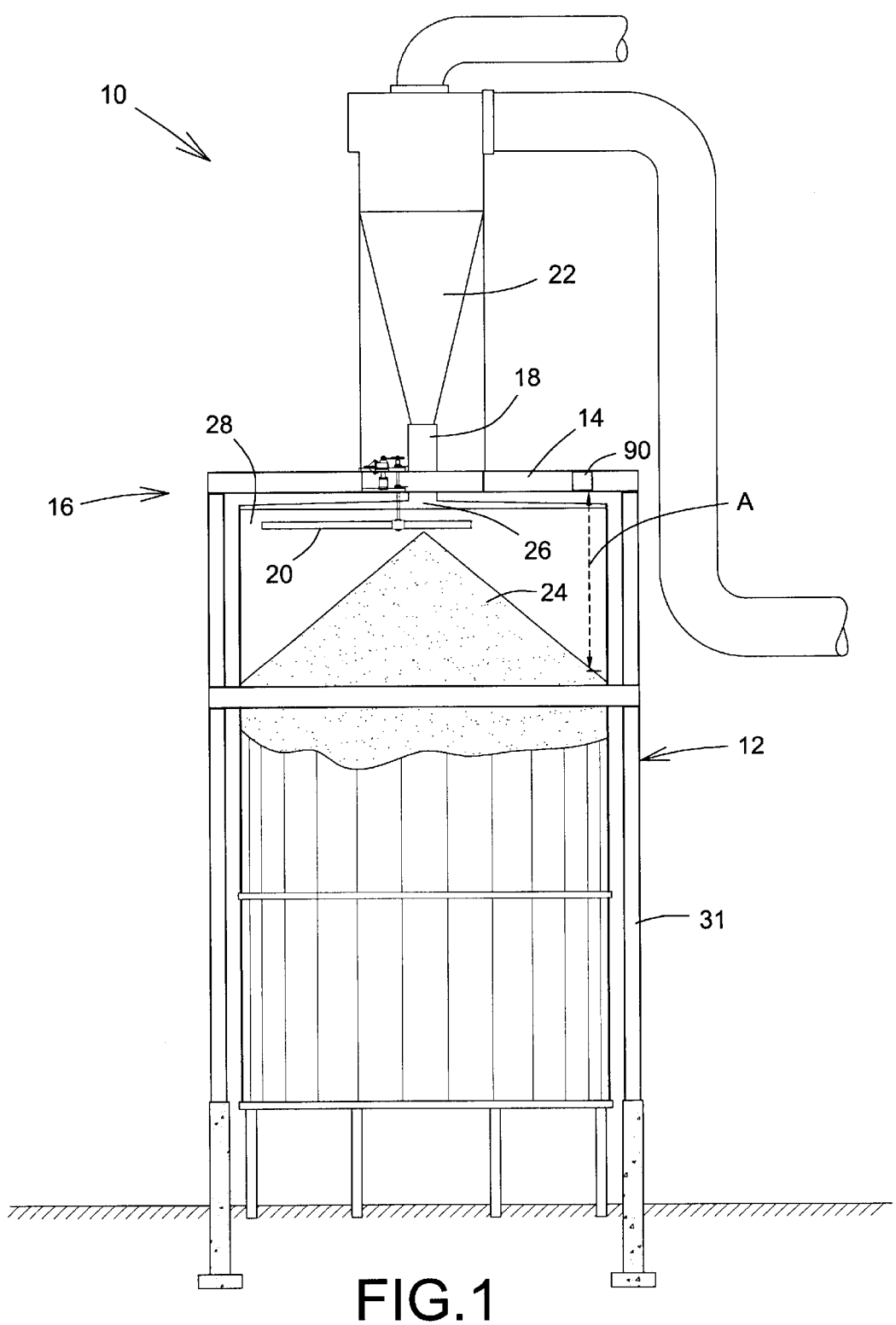
FIG. 1 is a simplified perspective partial cutaway view of an embodiment of a distribution device in a silo containing peaked particulate material.
Figure 2:
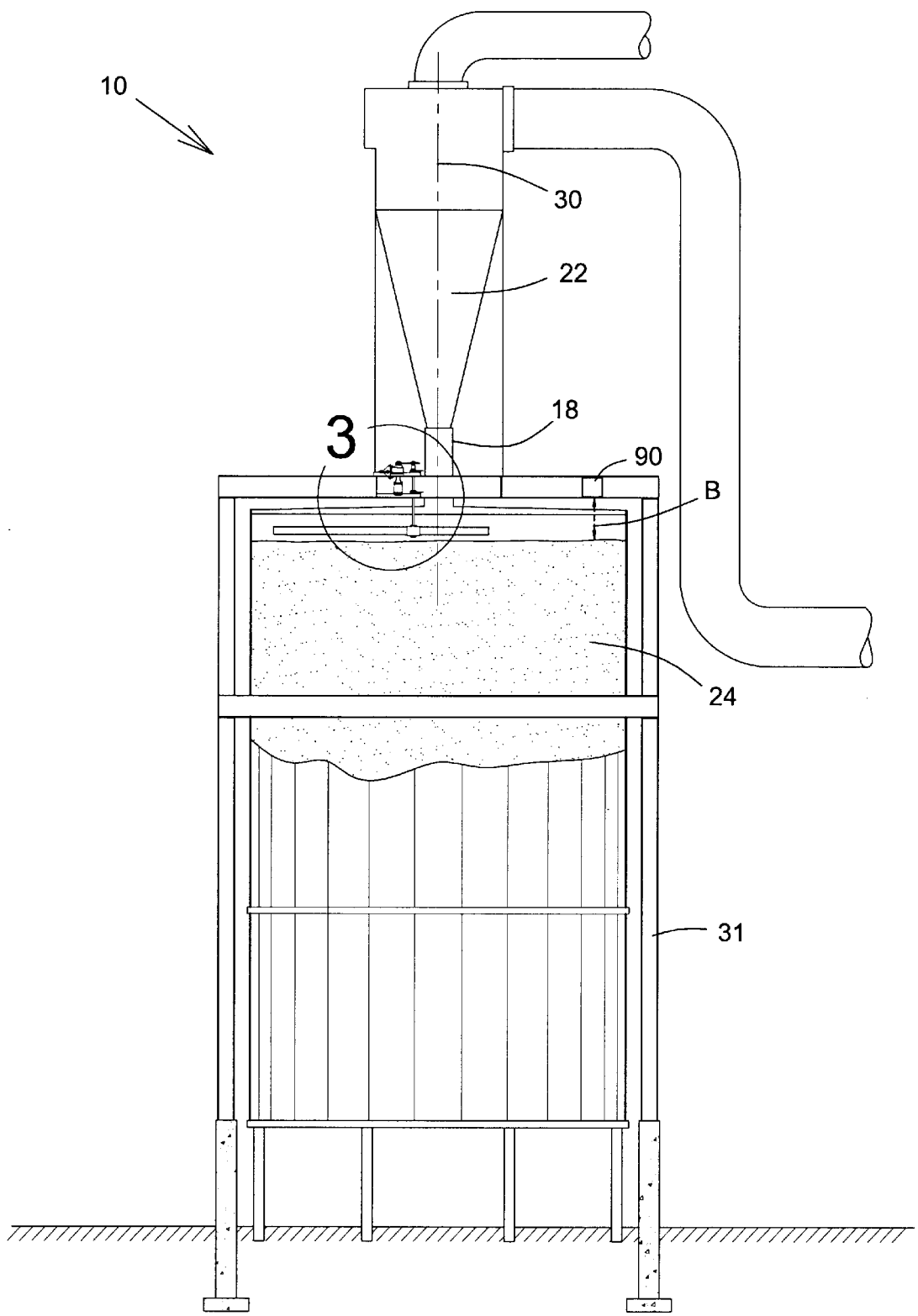
FIG. 2 is a simplified perspective partial cutaway view of the of FIG. 1 showing leveled particulate material.

FIGS. 1 and 2 illustrate an embodiment of a particulate material distribution device 10 for evenly distributing particulate material in a silo 12. The silo 12 includes a frame 14 connected to a silo upper end 16, which supports a feeder conduit 18 and a rotatable sweeper arm 20. A hopper 22 is connected to the feeder conduit 18, the hopper 22 being fed particulate material 24 from a source (not shown). Typically, the particulate material 24 is silage, woodchips, animal feed and the like. The feeder conduit 18 includes a feeder end portion 26, which is at least partially positioned in a silo open end 28. One skilled in the art will recognize that the feeder end portion 26 may be positioned above the open end 28, with the area around above the silo 12 being covered to reduce loss of particulates. Typically, the feeder conduit 18 has a feeder conduit axis 30, which is generally parallel to a silo sidewall 31. The material from the hopper 22 is channeled through the feeder conduit 18 along the feeder conduit axis 30 and exits the feeder end portion 26 generally vertically along the axis 30.

Figure 3:
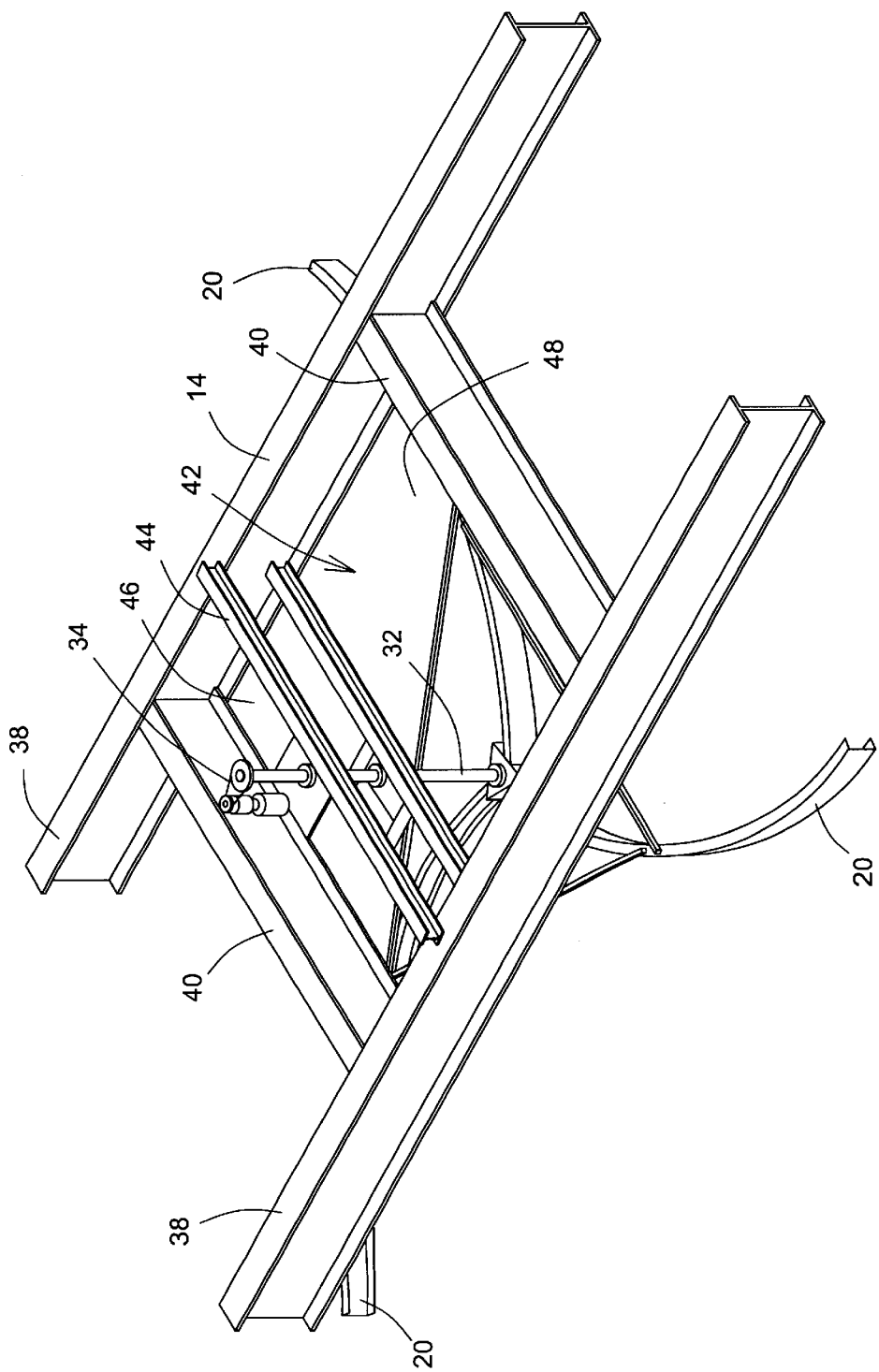
FIG. 3 is an enlarged perspective view taken along line 3 of FIG. 2, showing sweeper arms connected to a frame.
Figure 5:
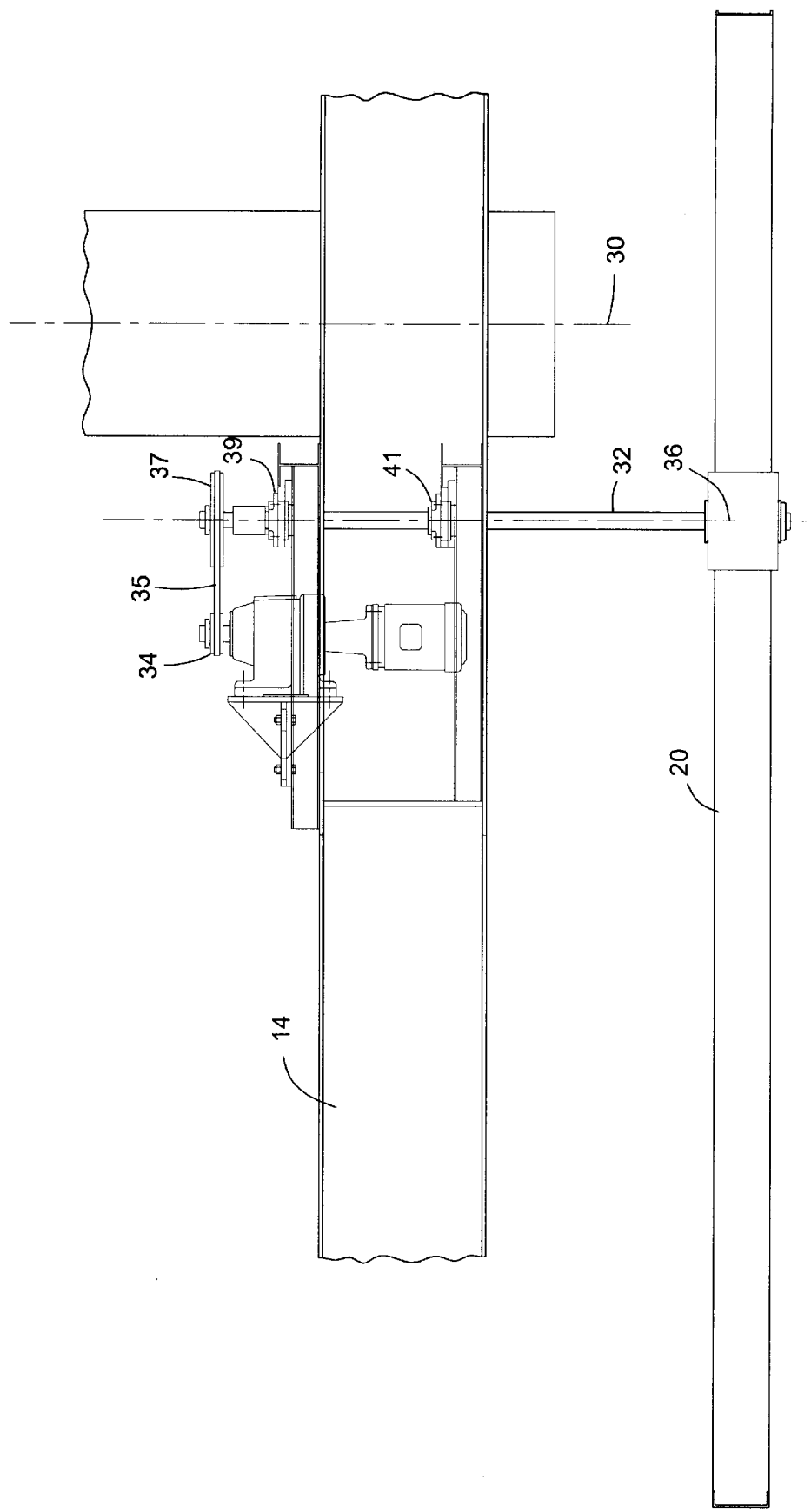
FIG. 5 is a partial side view of FIG. 3 showing the sweeper arms.

As best illustrated in FIGS. 1, 3 and 5, a sweeper arm axle 32 connects the sweeper arm 20 to the frame 14 and is driven by an actuator 34. The actuator 34 is typically a so-called soft start electric motor such as a Totally Enclosed Fan Cooled (TEFC) motor or the like (not shown), which is secured to the frame 14. Typically, the motor's speed of rotation depends on the type of material being distributed in the silo, the size of the device, and/or the flow rate of the material exiting the feeder conduit. Typically, the speed of rotation is between 3 rpm and 5 rpm. A drive belt (or chain) 35 connects the actuator 34 to a drive wheel 37, which rotates the sweeper arm axle 32 and the sweeper arm 20 about a sweeper arm axis of rotation 36. Two bearings 39 and 41, located in the frame 14, maintain the axial alignment of the sweeper axle 32 during rotation. The sweeper arm axis of rotation 36 is generally parallel to the feeder conduit axis 30. The sweeper arm 20 is positioned generally orthogonal relative to the feeder conduit axis 30. The sweeper arm 20 is positioned partially in the open end of the silo 28. The sweeper arm 20 is sufficiently spaced apart from the feeder conduit end to allow the particulate material to exit the feeder conduit end, but not to impede the rotation of the sweeper arm 20.

Figure 4:
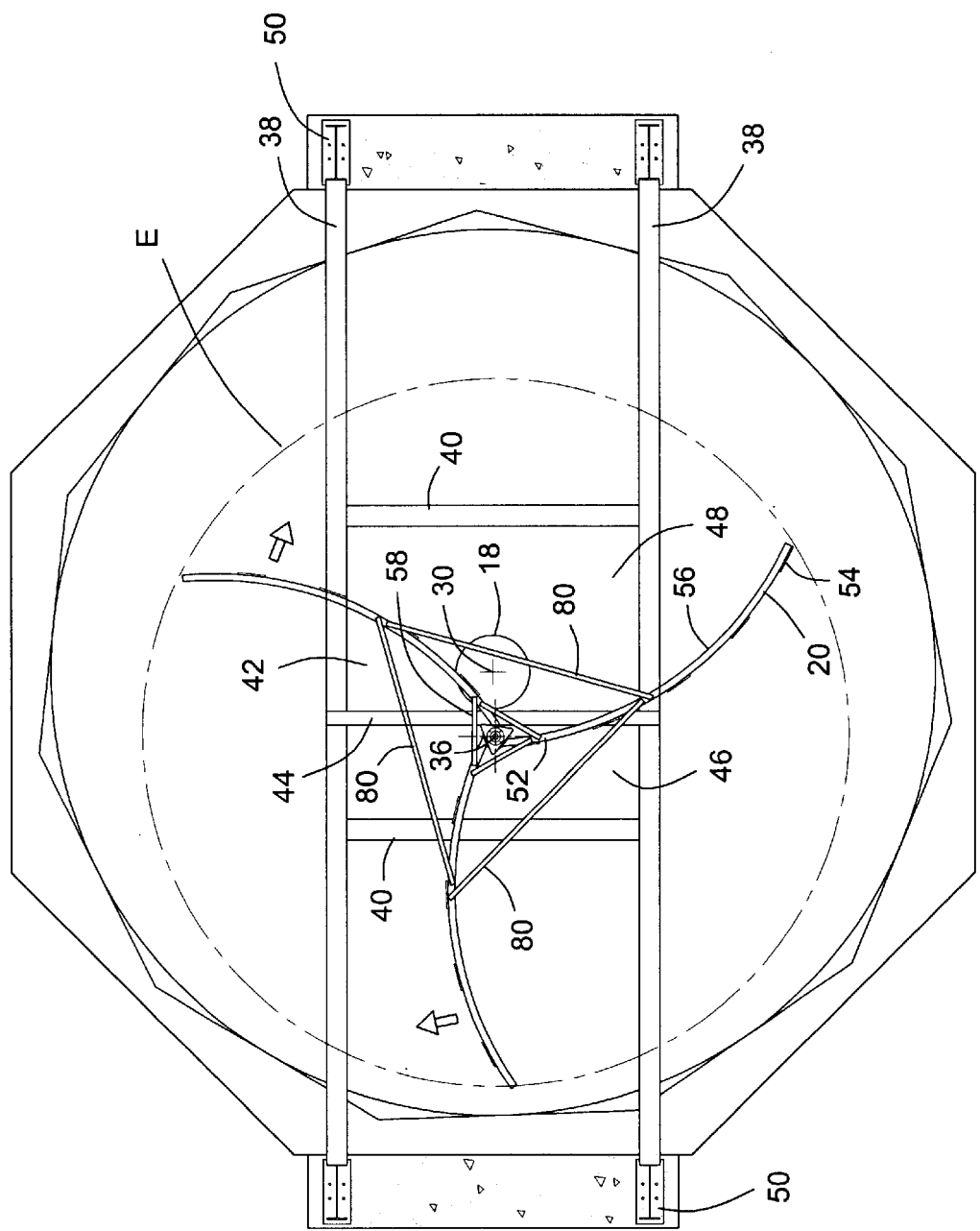
FIG. 4 is top view of FIG. 3 showing the sweeper arms.

As seen in FIGS. 1, 2 and 4, in a typical application the feeder conduit 18 is positioned in the center of the silo 12 such that the feeder conduit axis 30 runs through the center of the silo 12. The sweeper arm axle 32 is positioned to the side of the feeder conduit 18 so as to locate the sweeper arm axis of rotation 36 off-center away from the feeder conduit axis 30, so that the sweeper arm 20 rotates (in the direction of the arrows in FIG. 4) eccentrically as denoted by E. While FIG. 4 illustrates the feeder conduit 18 as being located centrally in the silo and the sweeper arm axis of rotation being off-center, one skilled in the art will recognize that this arrangement may be reversed without deviating from the scope of the invention. For example, the sweeper arm axis of rotation 36 may be located centrally in the silo with the feeder conduit 18 located off-centre from the feeder conduit axis 30.

Referring now to FIGS. 3 and 4, the frame 14 includes two parallel girders 38 which connect the frame to the silo upper portion 20. Two spacing girders 40 connect the two parallel girders 38 and together define a generally square central portion 42. A divider girder 44 divides the central portion into a sweeper portion 46 and a feeder portion 48. Typically, the sweeper portion 46 is smaller than the feeder portion 48. Typically, bolts 50 or the like, secure the frame 14 to the silo upper portion 20. The feeder conduit 18 is positioned through the feeder portion 48 so that it projects into the silo 12. Similarly, the sweeper arms 20 are positioned through the sweeper portion 46 of the frame 14 and project into the silo 12.

In a typical application, as best illustrated in FIGS. 3 and 4, the device 10 includes three rotatable sweeper arms 20, although two rotatable sweeper arms would provide essentially the same desired effect. Each sweeper arm 20 extends radially outwardly from the sweeper axle 32, and is equally spaced apart. In the case of a single sweeper arm 20 (not shown), the arm 20 may be balanced about the sweeper axis 36, thereby dividing the sweeper arm 20 into two equal portions that extend radially outwardly from the sweeper axle 32 or the single sweeper arm 20 may extend radially outwardly from one side of the sweeper axle 32. Since each sweeper arm 20 is identical, only one will be described in detail.

Referring now to FIG. 4 the sweeper arm 20 includes an arm connector portion 52, a distal end portion 54 and an intermediate arm portion 56, which interconnects the arm connector portion 52 and the distal end portion 54. The arm connector portion 52 is connected via a connector assembly 58 to the sweeper axle 32.

Figure 6:
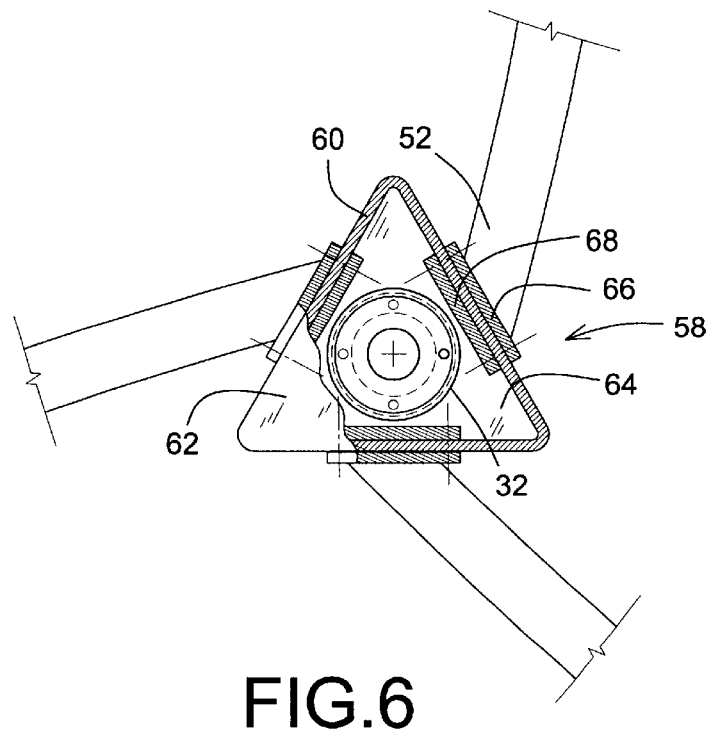
FIG. 6 is a partial top view of a sweeper arm connector.
Figure 7:
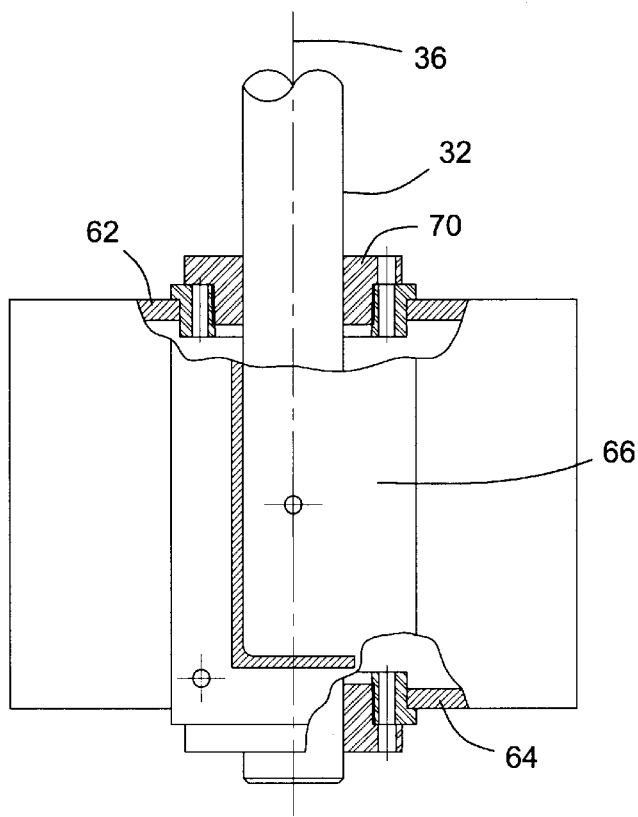
FIG. 7 is a partial cutaway view of a sweeper connector assembly.

Referring now to FIGS. 6 and 7, the connector assembly 58 includes a triangular mounting plate 60, which interconnects the arm connector portion 52 to the sweeper axle 32. The triangular mounting plate 60 includes an upper plate 62 and a lower plate 64, both of which are welded to the triangular plate 60. A first side plate 66 is secured to the arm connector portion 52 by bolting it to the mounting plate 60. Similarly, a second side plate 68 is soldered to the triangular plate 60 and bolted to the first side plate 66 through the triangular plate 60. A collar 70 connects the sweeper axle 32 to the connector assembly.

Figure 8:
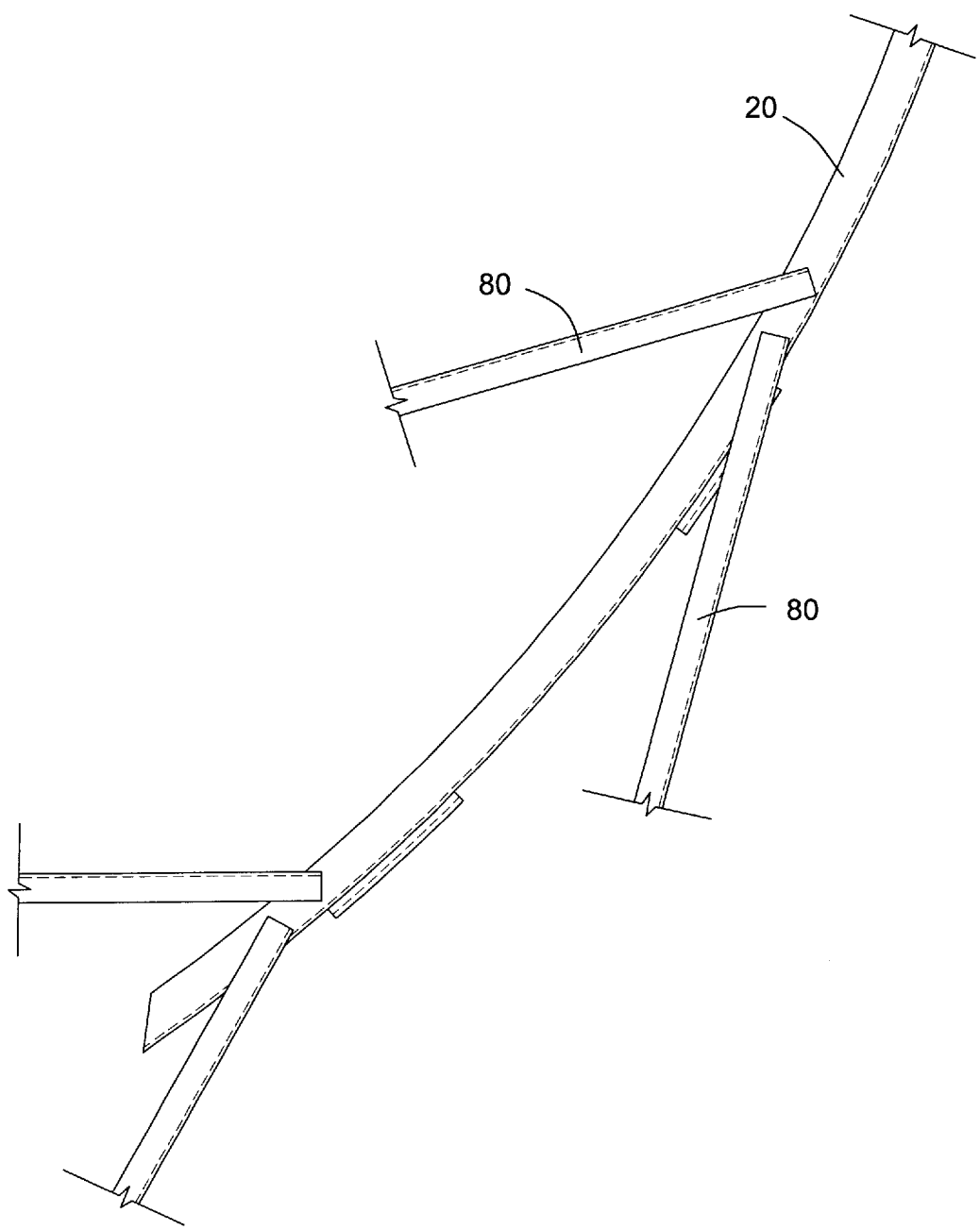
FIG. 8 is a partial top view of a sweeper arm showing stabilizing bars.

Referring now to FIGS. 4 and 8, a stabilizing bar 80 connects adjacent arms together near the arm connector portions 52 is connected between the arm connector portions of two adjacent sweeper arms. Viewed from above, the stabilizing bars 80, when connected to each respective sweeper arm 20 forms a triangle, which stabilizes the sweeper arms during rotation. The sweeper arm 20 is arcuate such that the convex part is disposed in the direction of rotation. The sweeper arm 20, when taken in cross section is generally C-shaped, as seen in FIG. 9, and includes a leading wall 82 and two trailing walls 84. The leading wall 82 is generally parallel to the sweeper axis of rotation 36, whereas the trailing walls 84 are generally horizontal to the surface of the particulate material.

As best illustrated in FIGS. 1 and 2, a level sensor 90 is connected to the frame 14. The level sensor 90 is in electrical communication with the actuator 34. Typically, the sensor 90 is a pre-calibrated Bat-type sonic sensor, which measures the height of the material 24 in the silo and relays signals to the actuator 34. Specifically, the sensor 90 sends out an ultra sound signal, which bounces off the material's surface and returns to the sensor 90, as is illustrated by arrows designated A and B. The time difference between when the sonic signal is sent out and when it returns to the sensor 90 indicates the level of the material 24 in the silo. Typically, as seen in FIG. 1, when the material reaches peak, a first predetermined level, the sensor 90 signals the actuator to start rotating the sweeper arms 20. As illustrated in FIG. 2, when the material 24 is essentially flat and close to the upper end of the silo, a second predetermined level, the sensor 90 signals the actuator to stop rotating the sweeper arms 20. Additionally, an alert signal is sent to the operator, that the silo is filled to capacity. Typically, the first predetermined level is: when a first portion of the particulate material reaches a peak height that is near the feeder conduit end. The sensor 90, when the material is at the first predetermined level, measures the distance between the positions of the lowest point of the side of the peaked material adjacent the silo sidewall 31 and the sensor 90. When the second portion of the particulate material reaches a second predetermined level, the particulate material is planar and uniform and near the lower end of the sweeper arms 20, the sensor 90 relays the second signal to the actuator 34 to stop the rotation of the sweeper arms 20.

Operation

The device's 10 operation will now be described with reference to FIGS. 1 and 2.

The particulate material 24, when it exits the feeder conduit 18 along the feeder conduit axis 30, fills the silo 12 up to the first predetermined level. While the particulate material 24 is moving through the feeder conduit 18, the sensor 90 signals the sweeper arms 20 to begin rotation. Particulate material, which exits the feeder conduit end, is captured by the surface of the sweeper arms 20, generally near the arm connector portion. The speed of rotation of the sweeper arms 20 causes the particulate material to move along the length of the sweeper arms 20 towards the silo sidewall, while at the same time being evenly deposited over the surface of the particulate material 24. The level of the particulate material 24 continues to rise in the silo 12 to the second predetermined level, at which time, the sensor 90 sends the second signal to the actuator 34 and the rotation stops. At this time, the surface of the particulate material is essentially uniform and free of peaks, and does not block the feeder conduit end. When use of the particulate material is required, an operator opens the silo 12 (not shown) to allow the particulate material to flow out of the silo 12, after which, the silo 12 is filled again, as described above.

Alternatives

For applications that require raking of the particulate material surface, alternative sweeper arms may be used. As illustrated in FIGS. 10a to 10c, illustrate a number of alternative sweeper arms 100 that include a plurality of spaced apart arm panels 102. Each arm panel 102 depends from a sweeper arm leading wall 104. The arm panels 102 are typically bolted to the leading wall 104, as shown in FIG. 11. Typically, the arm panels 102 are made from a resilient, rigid, non-stick material known to those skilled in the art. Examples of such materials include Teflon™, high-density polyethylene (HDPE) or ultra-high molecular weight polyethylene (UHMW-PE).

We claim:

1. A particulate material distribution device in combination with a silo, said particulate material distribution device for evenly distributing particulate material in said silo, said silo including a frame connected to a silo upper end for supporting a feeder conduit having a feeder end portion which is at least partially positioned in an open end of said silo, said feeder conduit having a feeder conduit axis which is generally parallel to a silo sidewall, said particulate material distribution device comprising:

a rotatable sweeper arm connected to said frame and positioned generally orthogonal relative to said feeder conduit axis, said rotatable sweeper arm being at least partially positioned in said open end of said silo and spaced apart from said feeder conduit end and having a sweeper arm axis of rotation which is generally parallel to said feeder conduit axis; and a level sensor connected to said frame and in communication with said rotatable sweeper arm to provide a first signal to said sweeper arm to rotate when a first portion of said particulate material reaches a first predetermined level in said silo, wherein said first portion of said particulate material is peak, and said sensor provides a second signal to said sweeper arm to stop rotation when a second portion of said particulate material reaches a second predetermined level in said silo.

2. The device, according to claim 1, in which said rotatable sweeper arm receives said particulate material from said feeder conduit end and sweeps said particulate material along a path of travel from said feeder conduit end towards said silo sidewall, said particulate material being evenly distributed over a surface of said particulate material adjacent said sweeper arm so that said feeder conduit end is unobstructed by said particulate material.

3. The device, according to claim 1, further comprises two rotatable sweeper arms.

4. The device, according to claim 1, further comprises three rotatable sweeper arms.

5. The device, according to claim 4, in which each sweeper arm extends radially outwardly from a sweeper axle, said axle being connected to said frame.

6. The device, according to claim 5, in which each sweeper arm includes:

an arm connector portion connected to said sweeper axle;
a distal end portion; and an intermediate arm portion interconnecting said connector portion and said distal end portion.

7. The device, according to claim 6, in which said intermediate arm portion includes: a leading wall and two trailing walls, said leading wall being generally parallel to said sweeper axis of rotation, said trailing walls being generally horizontal.

8. The device, according to claim 7, in which a plurality of spaced apart arm panels are connected to said intermediate arm portion, each arm panel depending from said leading wall.

9. The device, according to claim 8, in which said arm panels are made from PTFE or UHMW-PE.

10. The device, according to claim 6, in which a triangular mounting plate interconnects said arm connector portions to said sweeper axle.

11. The device, according to claim 10, further includes a stabilizing bar connected between said arm connector portion of each arm.

12. The device, according to claim 10, in which an actuator is connected to said sweeper axle to rotate said rotatable sweeper arm, said actuator being mounted on said frame.

13. The device, according to claim 6, in which said sweeper arm is arcuate in the direction of said rotation.

14. The device, according to claim 1, in which said feeder conduit axis is located generally centrally said silo, said sweeper arm axis of rotation being off-center such that said sweeper arm rotates eccentrically.

15. The device, according to claim 1, in which said second portion of said material is generally planar.

16. The device, according to claim 1, in which said sensor is a sonic Bat-type sensor.

* * * * *